E. A. JERN.
SUPPORT FOR THE MOTOR ON MOTOR DRIVEN VEHICLES OR THE LIKE.
APPLICATION FILED OCT. 27, 1915.
1,217,602.
Patented Feb. 27, 1917.
3 SHEETS—SHEET 1.
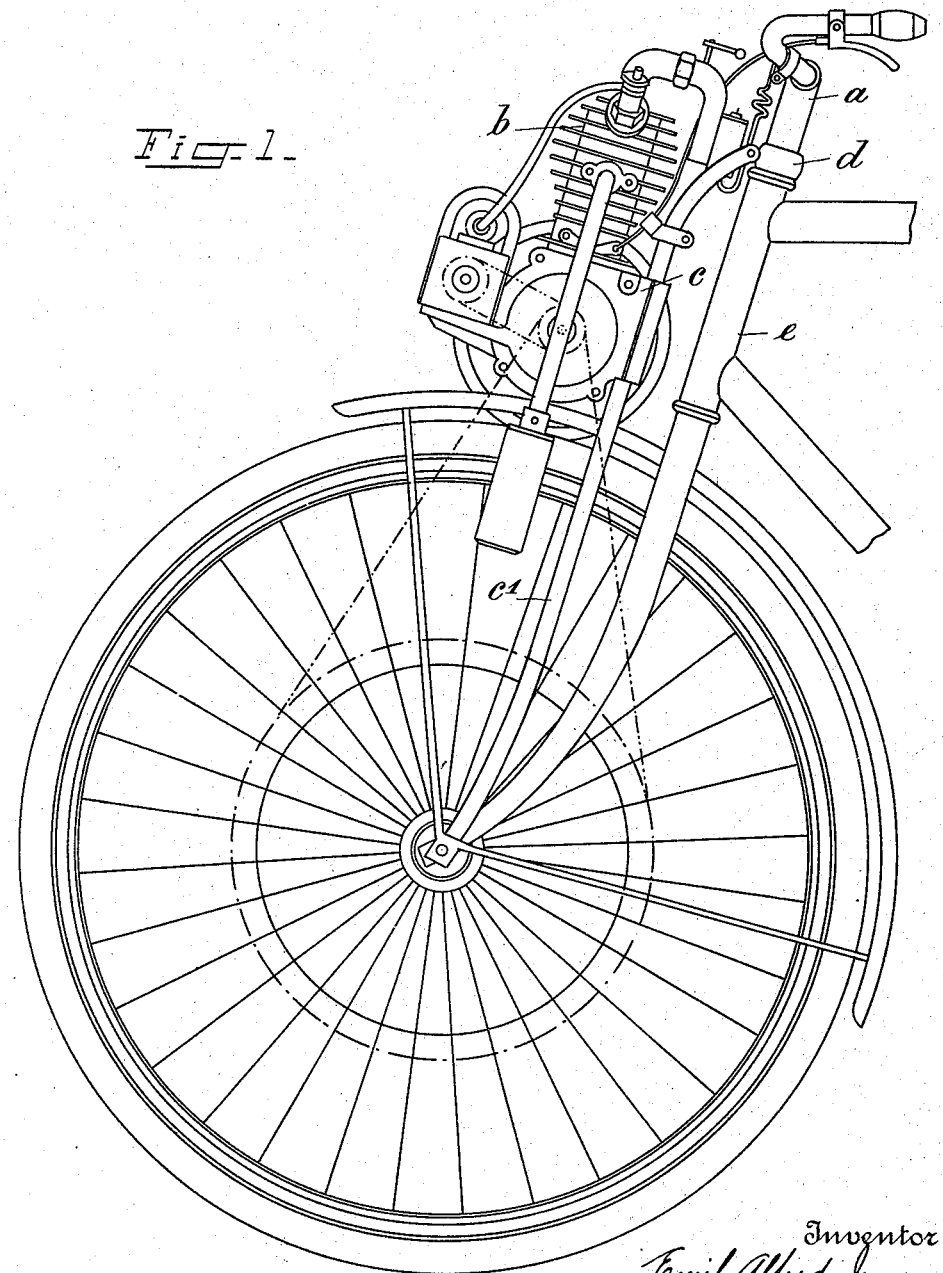

E. A. JERN.
SUPPORT FOR THE MOTOR ON MOTOR DRIVEN VEHICLES OR THE LIKE.
APPLICATION FILED OCT. 27, 1915.
1,217,602.
Patented Feb. 27, 1917.
3 SHEETS—SHEET 2.
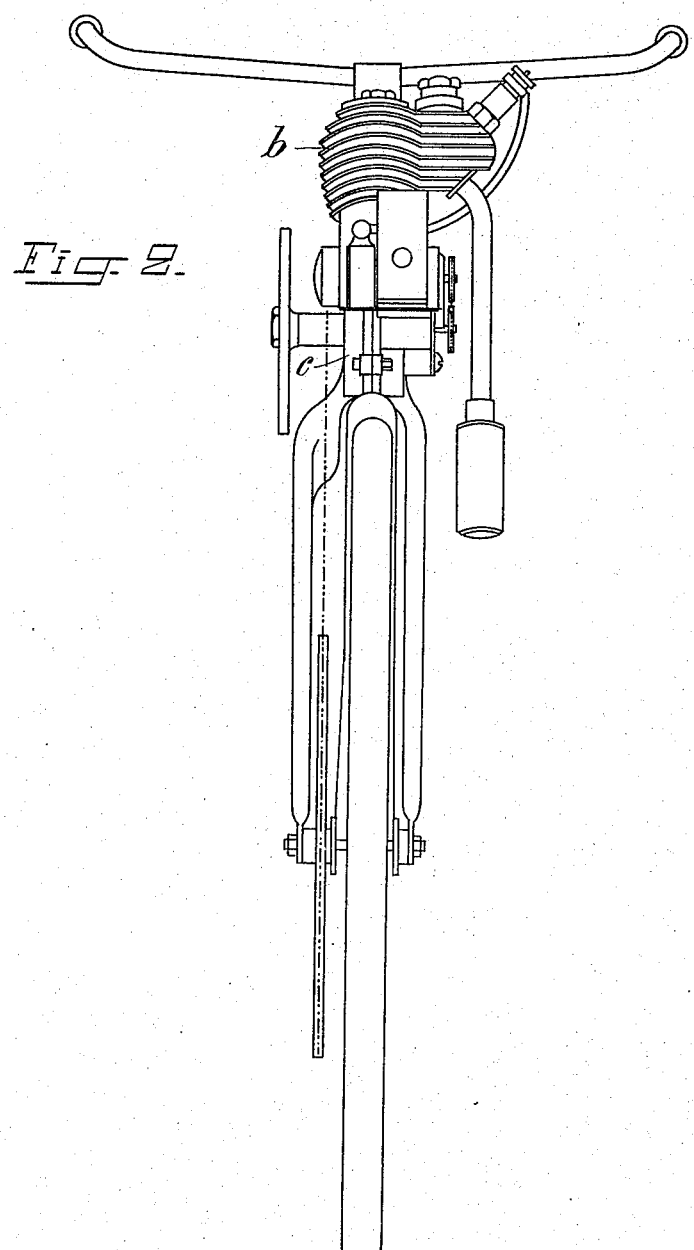

E. A. JERN.
SUPPORT FOR THE MOTOR ON MOTOR DRIVEN VEHICLES OR THE LIKE.
APPLICATION FILED OCT. 27, 1915.
1,217,602.
Patented Feb. 27, 1917.
3 SHEETS—SHEET 3.
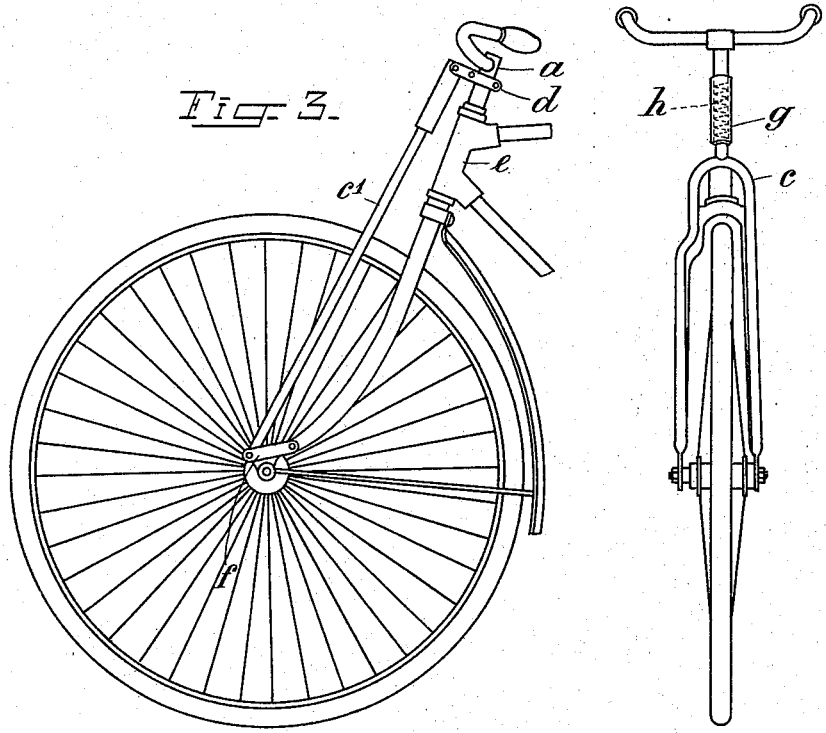
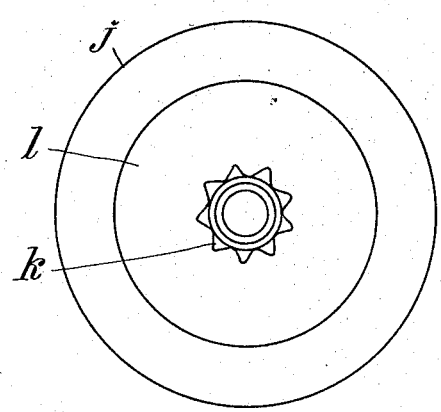
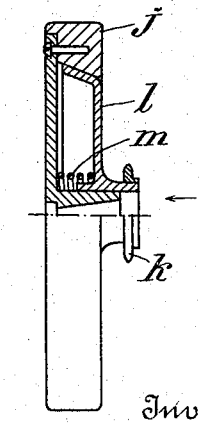

UNITED STATES PATENT OFFICE.

EMIL ALFRED JERN, OF GÄVLE, SWEDEN.

SUPPORT FOR THE MOTOR ON MOTOR-DRIVEN VEHICLES OR THE LIKE.

1,217,602.　　　　　Specification of Letters Patent.　　Patented Feb. 27, 1917.

Application filed October 27, 1915. Serial No. 58,258.

*To all whom it may concern:*

Be it known that I, EMIL ALFRED JERN, a subject of the King of Sweden, residing at Gävle, Sweden, have invented certain new and useful Improvements in Supports for the Motor on Motor-Driven Vehicles or the like, of which the following is a specification.

This invention relates to a support for the motor on motor driven vehicles of that class wherein the motor is so arranged as to co-act in the turning movement of the steering wheel fork.

The invention consists chiefly in mounting the motor on a special frame, suspended by springs on the usual vehicle-frame.

In order that my invention may be more fully understood I have caused to be appended hereunto three sheets of drawings marked with letters of reference indicating like parts in the various figures and showing two modifications in which my invention may be carried out.

Figure 1 is a side view and Fig. 2 a front view of the first modification.

Fig. 3 is a side view and Fig. 4 a front view of the other modification, and Figs. 5 and 6 show a detail.

Referring to Figs. 1 and 2 $a$ represents the steering wheel fork, $b$ the motor, and $c$ the frame supporting the motor. The frame $c$ is secured to a fork $c'$, the lower end of which is secured to the shaft of the steering wheel, while the upper end of the fork is attached to the flange $d$ of the steering wheel fork, resting upon the upper end of the guide $e$ for the fork $a$. The motor $b$ is attached to the upper part of the frame $c$ just above the steering wheel.

In accordance with the modification shown in Figs. 3 and 4 the steering wheel fork as well as the fork of the frame $c$ are not as in Figs. 1 and 2 directly connected to the shaft of the steering wheel but articulated with two links $f$ being arranged on each end of the shaft. The upper end of the frame $c$ is further by means of springs connected with the steering wheel fork in such a way that it enters into a shell $g$ attached to the fork $a$, and a coil-spring $h$ is provided in said shell. In such manner the frame $c$ supporting the motor is elastically supported on the vehicle.

For disengaging the motor, whereby the motor does not act upon the steering wheel, a special arrangement shown in Figs. 5 and 6 is taken.

The fly-wheel $j$ mounted on the head-shaft of the motor is connected on the one hand by means of a friction-disk $l$ with the chain-wheel $k$ of the chain-transmission between the motor and the front wheel, being the said chain-wheel attached to the friction-disk by means of threads and being inserted into the fly-wheel, whereby the peripherical, conical formed surface of the chain-wheel by means of a spring $m$ is pressed against a friction-surface on the fly-wheel formed in a corresponding way.

When the motor is to be disconnected the friction-wheel is moved by means of a system of levers (not shown) in direction of the arrow in Fig. 6 against the force of the spring whereby the friction-surfaces are moved from each other and cannot catch each other.

Having now particularly described and ascertained the nature of my said invention and in what manner the same is to be performed, I declare that what I claim is:—

1. The combination with a motor-driven vehicle, of a motor, a frame carrying said motor detachably fastened to the steering frame of the vehicle, links connecting the lower end of said frame with the lower end of said steering frame, a shell in said steering frame, a spring in said shell against which the upper end of said motor carrying frame is resting, and means for disengagingly connecting said motor and steering frame, substantially as described.

2. The combination with a motor driven vehicle, of a motor, a frame carrying said motor detachably fastened to the steering frame of the vehicle, links connecting the lower end of said frame with the lower end of said steering-frame, a shell in said steering frame, a spring in said shell against which the upper end of said motor carrying frame is resting, and a shiftable friction-wheel on the motor shaft adapted to engage the chain-wheel of the transmission between motor and steering wheel for engaging and disengaging said motor and steering frame, substantially as described.

3. The combination with a motor driven vehicle, of a motor, a frame carrying said motor, and yieldingly mounted in front of the steering frame of the vehicle, links connecting the lower end of said frame with the lower end of said steering frame, said links being mounted on the front wheel shaft.

4. The combination with a motor driven vehicle, of a motor, a frame carrying said motor, and yieldingly mounted in front of the steering frame of the vehicle, said motor carrying frame being fork-shaped, the fork grasping over the front wheel, links connecting the shanks of said motor carrying frame with the shanks of the steering frame fork, said link being mounted on the front wheel shaft.

5. In a motor driven vehicle, the combination of a frame mounted in front of the steering frame of the vehicle, a motor rigidly mounted on the front side of the first said frame, links connecting the lower end of the steering frame with the lower end of the motor carrying frame, a spring inserted between a part of the motor carrying frame, and a part of the steering frame.

In testimony whereof I affix my signature in presence of two witnesses.

EMIL ALFRED JERN.

Copies of this patent may be obtained for five cents each, by addressing the "Commissioner of Patents, Washington, D. C."